(12) United States Patent
Oniki

(10) Patent No.: US 11,030,749 B2
(45) Date of Patent: Jun. 8, 2021

(54) IMAGE-PROCESSING APPARATUS, IMAGE-PROCESSING METHOD, AND STORAGE MEDIUM STORING IMAGE-PROCESSING PROGRAM

(71) Applicant: OLYMPUS CORPORATION, Hachioji (JP)

(72) Inventor: Wataru Oniki, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 117 days.

(21) Appl. No.: 16/389,750

(22) Filed: Apr. 19, 2019

(65) Prior Publication Data

US 2019/0244360 A1 Aug. 8, 2019

Related U.S. Application Data

(63) Continuation of application No. PCT/JP2016/082098, filed on Oct. 28, 2016.

(51) Int. Cl.
*G06K 9/00* (2006.01)
*G06K 9/34* (2006.01)
(Continued)

(52) U.S. Cl.
CPC .............. *G06T 7/11* (2017.01); *G06K 9/4671* (2013.01); *H04N 5/232* (2013.01); *G06T 2207/20021* (2013.01); *G06T 2207/20164* (2013.01)

(58) Field of Classification Search
CPC ............. G06T 7/11; G06T 2207/20021; G06T 2207/20164; H04N 5/232; G06K 9/4671; G06K 9/3233
See application file for complete search history.

(56) References Cited

U.S. PATENT DOCUMENTS

2002/0154833 A1 10/2002 Koch et al.
2006/0215922 A1 9/2006 Koch et al.
(Continued)

FOREIGN PATENT DOCUMENTS

JP 5609425 B2 10/2014
JP 2015215741 A 12/2015

OTHER PUBLICATIONS

Ali Borji et al., "Exploiting Local and Global Patch Rarities for Saliency Detection" IEEE, 2012.*
(Continued)

*Primary Examiner* — Samir A Ahmed
(74) *Attorney, Agent, or Firm* — Holtz, Holtz & Volek PC

(57) ABSTRACT

An image-processing apparatus including: an image processor including circuitry or a hardware processor that operates under control of a stored program, the image processor being configured to execute processes including: a saliency-map calculating process that calculates saliency maps on a basis of at least one type of feature quantity obtained from an input image; a salient-region-identifying process that identifies a salient region by using the saliency maps; a salient-region-score-calculating process that calculates a score of the salient region by comparing a distribution of values of the saliency map in the salient region and a distribution of values of the saliency map in a region other than the salient region; and a saliency-evaluating process that evaluates the saliency of the salient region on a basis of the score.

7 Claims, 13 Drawing Sheets

(51) Int. Cl.
*G06T 7/11* (2017.01)
*G06K 9/46* (2006.01)
*H04N 5/232* (2006.01)

(56) References Cited

U.S. PATENT DOCUMENTS

| | | | |
|---|---|---|---|
| 2009/0112287 A1* | 4/2009 | Greenberg | G09B 21/008 607/54 |
| 2010/0322521 A1* | 12/2010 | Tal | G06T 11/60 382/199 |
| 2012/0106850 A1 | 5/2012 | Koch et al. | |
| 2012/0148153 A1* | 6/2012 | Kitamura | G06T 7/12 382/165 |
| 2012/0155724 A1* | 6/2012 | Kitamura | G06T 7/12 382/128 |
| 2012/0256941 A1* | 10/2012 | Ballestad | G06K 9/00234 345/589 |
| 2015/0324995 A1 | 11/2015 | Yamamoto | |
| 2016/0086050 A1* | 3/2016 | Piekniewski | G06K 9/48 382/103 |

OTHER PUBLICATIONS

Lijun Wang et al., "Deep Networks for Saliency Detection via Local Estimation and Global Search", Computer Vision Foundatio, IEEE Xplore, CVPR2015.*

Erkut Erdem et al., "Visual saliency estimation by nonlinearly integrating features using region covariances", Journal of Vision Mar. 2013, vol. 13, 11.*

Hikaru Manabe et al., "A method to Design Conspicuous Region Using Color Features", The 19th KOrea-Japan Joint Workshop on Frontiers of Computer Vision, 2013 IEEE.*

Hikaru Manabe, et al., "Chumoku Ryoiki no Size to Shikiso Saido Meido no Kenchosei 0 Mochiita Medatsu Ryoiki Suitei Shuho," Meeting on Image Recognition and Understanding (MIRU2011), Jul. 2011, pp. 1570-1576.

International Search Report (ISR) dated Jan. 17, 2017 issued in International Application No. PCT/JP2016/082098.

Written Opinion dated Jan. 17, 2017 issued in International Application No. PCT/JP2016/082098.

* cited by examiner

IMAGE-PROCESSING APPARATUS, IMAGE-PROCESSING METHOD, AND STORAGE MEDIUM STORING IMAGE-PROCESSING PROGRAM

CROSS-REFERENCE TO RELATED APPLICATIONS

This is a continuation of International Application PCT/JP2016/082098, with an international filing date of Oct. 28, 2016, which is hereby incorporated by reference herein in its entirety.

TECHNICAL FIELD

The present invention relates to an image-processing apparatus, an image-processing method, and an image-processing program.

BACKGROUND ART

In the related art, as a form of information in which the degree of visual prominence, that is, saliency, is visualized for the entirety of an image, there is a known saliency map.

Patent Literature 1 discloses an image-processing apparatus that calculates a score for each of multiple types of feature quantity by using heterogeneity, the sense of incompatibility, or the like, which is an indicator of saliency, and that predicts a region of a principal imaging subject on the basis of the calculated scores.

CITATION LIST

Patent Literature

{PTL 1} Publication of Japanese Patent No. 5609425

SUMMARY OF INVENTION

A first aspect of the present invention is an image-processing apparatus including: an image processor including circuitry or a hardware processor that operates under control of a stored program, the image processor being configured to execute processes including: a saliency-map calculating process that calculates saliency maps on a basis of at least one type of feature quantity obtained from an input image; a salient-region-identifying process that identifies a salient region by using the saliency maps; a salient-region-score-calculating process that calculates a score of the salient region by comparing a distribution of values of the saliency map in the salient region and a distribution of values of the saliency map in a region other than the salient region; and a saliency-evaluating process that evaluates the saliency of the salient region on a basis of the score.

A second aspect of the present invention is an image processor including circuitry or a hardware processor that operates under control of a stored program, the image processor being configured to execute processes including: a saliency-map calculating process that calculates saliency maps on a basis of at least one type of feature quantity obtained from an input image; a salient-region-identifying process that identifies a salient region by using the saliency maps; a salient-region-score-calculating process that calculates a score by using a number of local maximum points in the saliency map in the region other than the salient region; and a saliency-evaluating process that evaluates the saliency of the salient region on a basis of the score.

A third aspect of the present invention is an image-processing method including: calculating saliency maps on a basis of at least one type of feature quantity obtained from an input image; identifying a salient region by using the saliency maps; calculating a score of the salient region by comparing a distribution of values of the saliency map in the salient region and a distribution of values of the saliency map in a region other than the salient region; and evaluating the saliency of the salient region on a basis of the score.

A fourth aspect of the present invention is a non-transitory computer-readable storage medium storing an image-processing program that causes a computer to execute: calculating saliency maps on a basis of at least one type of feature quantity obtained from an input image; identifying a salient region by using the saliency maps; calculating a score of the salient region by comparing a distribution of values of the saliency map in the salient region and a distribution of values of the saliency map in a region other than the salient region; and evaluating the saliency of the salient region on a basis of the score.

A fifth aspect of the present invention is an image-processing method including: calculating saliency maps on a basis of at least one type of feature quantity obtained from an input image; identifying a salient region by using the saliency maps; calculating a score by using a number of local maximum points in the saliency map in a region other than the salient region; and evaluating the saliency of the salient region on a basis of the score.

A sixth aspect of the present invention is a non-transitory computer-readable storage medium storing an image-processing program that causes a computer to execute: calculating saliency maps on a basis of at least one type of feature quantity obtained from an input image; identifying a salient region by using the saliency maps; calculating a score by using a number of local maximum points in the saliency map in a region other than the salient region; and evaluating the saliency of the salient region on a basis of the score.

DESCRIPTION OF EMBODIMENTS

Embodiments of an image-processing apparatus according to the present invention will be described below with reference to the drawings. Note that the image-processing apparatus according to these embodiments is provided with a processor (not shown) and storage apparatuses (not shown), such as a ROM (Read Only Memory) and a RAM (Random Access Memory), and is configured to execute, by means of the processor, individual types of processing, described later. Note that, in the following embodiments, although the image-processing apparatus is implemented by causing a computer to execute an image-processing program, which is software, there is no limitation thereto, and the image-processing apparatus may be implemented by means of hardware, such as a circuit on a silicon chip.

First Embodiment

Figure 1:
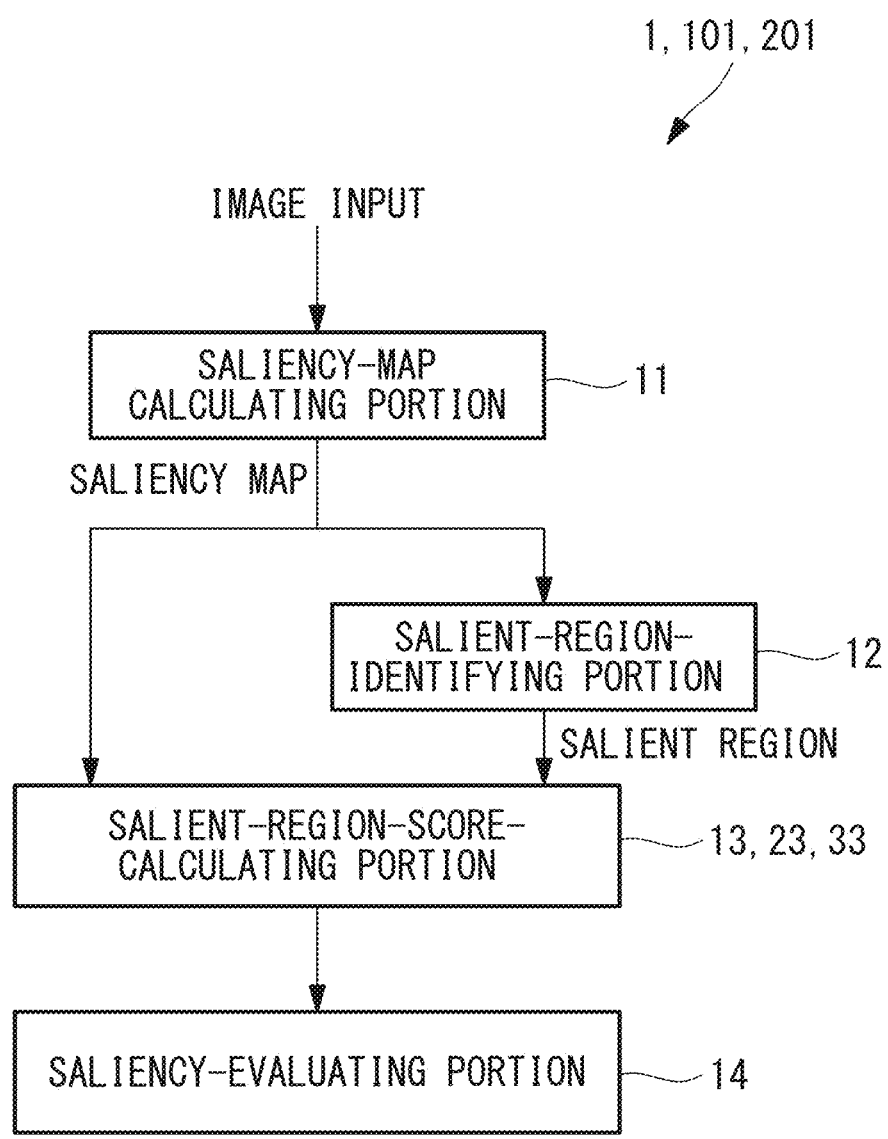
FIG. 1 is a diagram showing, in outline, image-processing apparatuses according to first to third embodiments of the present invention.

As shown in FIG. 1, an image-processing apparatus 1 according to a first embodiment is provided with, as functional blocks: a saliency-map-calculating portion 11; a salient-region-identifying portion 12; a salient-region-score-calculating portion 13; and a saliency-evaluating portion 14.

The saliency-map-calculating portion 11 is connected to the salient-region-identifying portion 12 and the salient-region-score-calculating portion 13. The salient-region-identifying portion 12 is connected to the salient-region-score-calculating portion 13. The salient-region-score-calculating portion 13 is connected to the saliency-evaluating portion 14.

Figure 2:
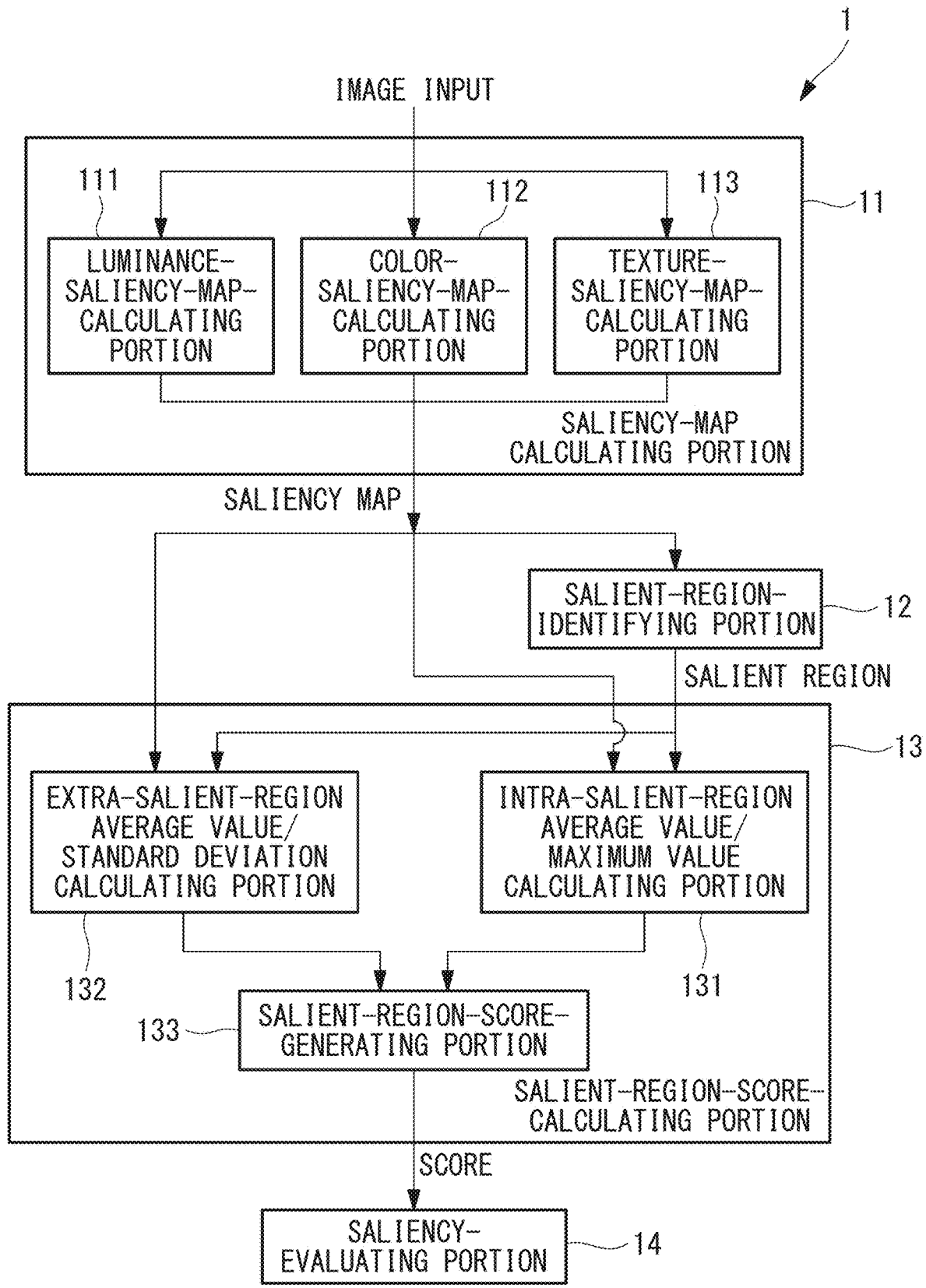
FIG. 2 is a diagram showing the internal configuration of the image-processing apparatus according to the first embodiment of the present invention.

As shown in FIG. 2, the saliency-map-calculating portion 11 is provided with a luminance-saliency-map-calculating portion 111, a color-saliency-map-calculating portion 112, and a texture-saliency-map-calculating portion 113, and is configured to individually calculate, on the basis of an input image, a luminance saliency map, which is a saliency map based on the luminance, a color saliency map, which is a saliency map based on the color, and a texture saliency map, which is a saliency map based on the texture.

Figure 4:
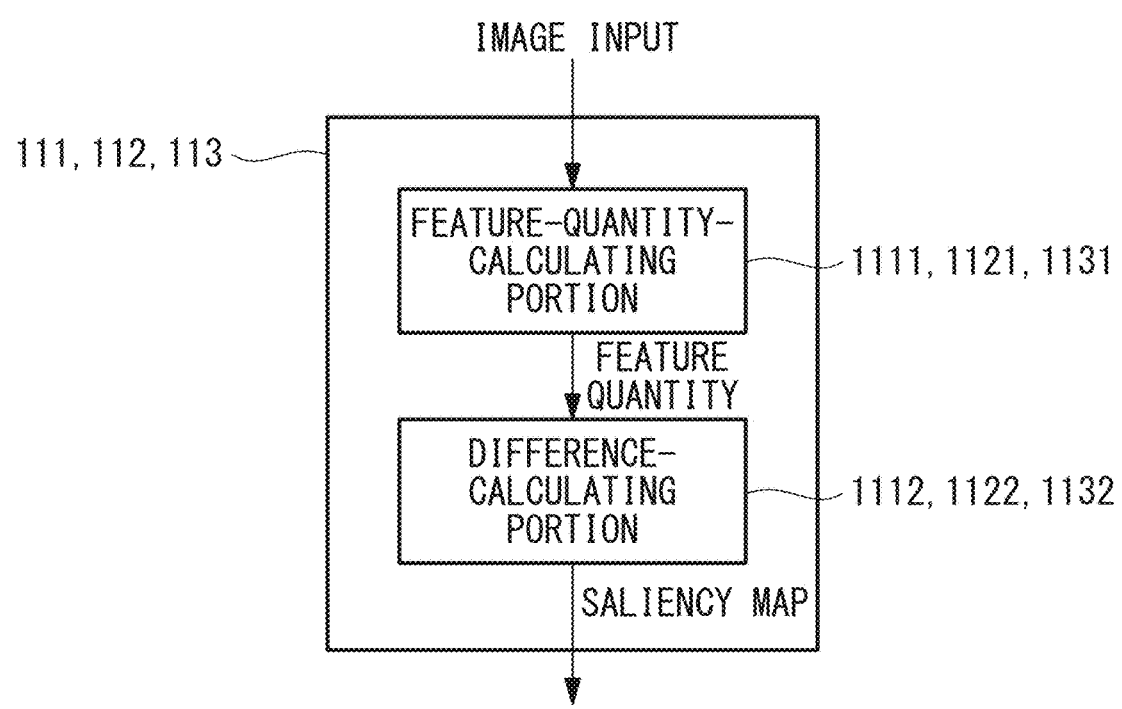
FIG. 4 is a diagram showing the respective internal configurations of a luminance-saliency-map-calculating portion, a color-saliency-map-calculating portion, and a texture-saliency-map-calculating portion provided in the image-processing apparatus shown in FIG. 2.

As shown in FIG. 4, the luminance-saliency-map-calculating portion 111 is: provided with a feature-quantity-calculating portion 1111 that calculates, with respect to the input image, the luminance, which is a feature quantity, and a difference-calculating portion 1112 that divides the image for which the luminance has been calculated into a plurality of blocks and that calculates differences between luminance of the individual divided blocks and luminance of the blocks on the periphery thereof; and configured to calculate the luminance saliency map.

The color-saliency-map-calculating portion 112 is: provided with a feature-quantity-calculating portion 1121 that calculates, with respect to the input image, the color, which is a feature quantity, and a difference-calculating portion 1122 that divides the image for which the color has been calculated into a plurality of blocks and that calculates differences between colors of the individual divided blocks and colors of the blocks on the periphery thereof; and configured to calculate the color saliency map.

The texture-saliency-map-calculating portion 113 is: provided with a feature-quantity-calculating portion 1131 that calculates, with respect to the input image, the texture, which is a feature quantity, and a difference-calculating portion 1132 that divides the image for which the texture has been calculated into a plurality of blocks and that calculates differences between textures of the individual divided blocks and textures of the blocks in the periphery thereof; and configured to calculate the texture saliency map.

More specifically, in the difference-calculating portions 1112, 1122, and 1132, one of the plurality of blocks is assumed to be a block of interest, and the differences between the feature quantities of this block of interest and the feature quantities of the blocks in periphery thereof are calculated as the saliency. Then, by sliding the block of interest over the entire image, the saliency maps in which the saliency is visualized for the entire image are generated.

Figure 3:
FIG. 3 is a schematic diagram for explaining a color image, which is an example of an input image.
Figure 5A:
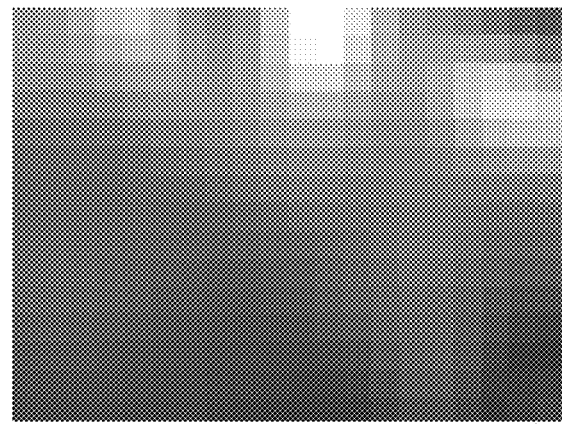
FIG. 5A is a map diagram showing a luminance saliency generated on the basis of the luminance of the color image explained in FIG. 3.
Figure 5B:
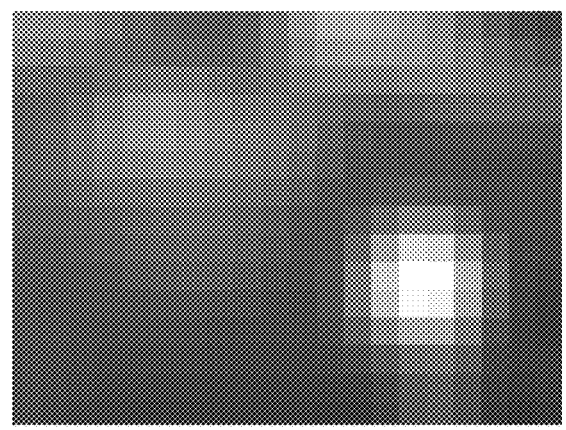
FIG. 5B is a diagram showing a color saliency map generated on the basis of the color of the color image explained in FIG. 3.
Figure 5C:
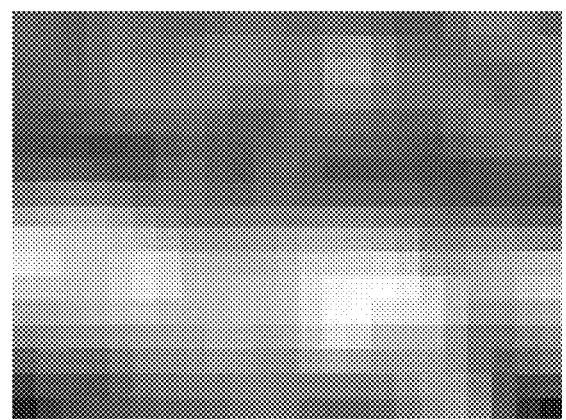
FIG. 5C is a diagram showing a texture saliency map generated on the basis of the texture of the color image explained in FIG. 3.

FIGS. 5A to 5C respectively show a luminance saliency map, a color saliency map, and a texture saliency map that are calculated from an input image shown in FIG. 3. Note that, although FIG. 3 shows a schematic diagram of the input image depicted in the form of an illustration, this input image actually is a color image acquired by an image-acquisition apparatus such as a camera. In the actual color image, the lower right portion of FIG. 3 shows a scene in which three flowers that bear a reddish color and have relatively high saturations are blooming. In addition, a portion corresponding to approximately the lower ⅔ of FIG. 3 shows a scene in which green leaves that have a relatively fine texture are growing abundantly. In addition, a portion corresponding to approximately the upper ⅓ of FIG. 3 is a defocused background portion bearing a whitish color.

Because the luminance saliency map shown in FIG. 5A is generated on the basis of the luminance, the saliency is high in the background portion that bears the whitish color and that has a relatively high luminance. Because the color saliency map shown in FIG. 5B is generated on the basis of the color, the saliency is particularly high in the portion having the flowers that bear the reddish color. Because the texture saliency map shown in FIG. 5C is generated on the basis of the texture, the saliency is high in the portion corresponding to approximately the lower ⅔ of the image in which the texture is relatively fine.

Figure 6A:
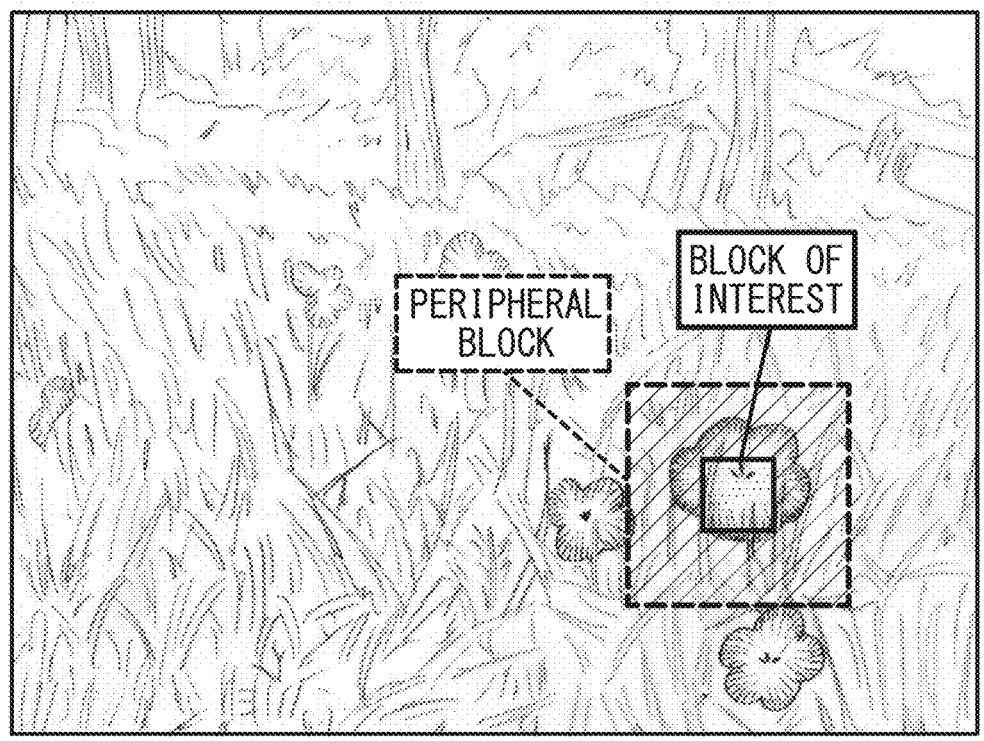
FIG. 6A is a diagram for explaining an example scale in the saliency map.
Figure 6B:
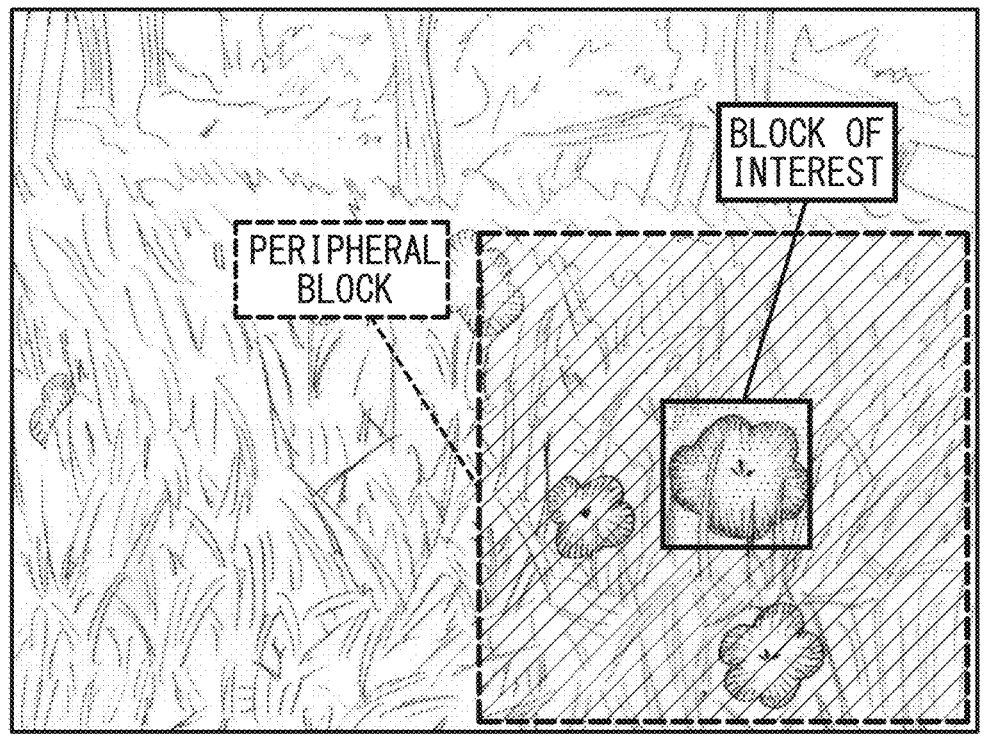
FIG. 6B is a diagram for explaining another example scale in the saliency map.

Note that the saliency-map-calculating portion 11 may be configured so that a plurality of saliency maps are calculated for one feature quantity by using a plurality of combinations of the sizes of the blocks and the areas of the peripheral blocks, in other words, scales. In FIGS. 6A and 6B, examples of different scales are shown. In each of FIGS. 6A and 6B, the portion that is surrounded by the solid line indicates the block of interest, and the portion that is surrounded by the broken line and that is hatched indicates the peripheral block. The combination of these two is referred to as the scale. By changing the scales of the saliency maps, it is possible to change the size of the imaging subject to which the saliency maps respond. Therefore, by using multiple scales, it is possible to detect imaging subjects of various sizes.

Figure 7A:
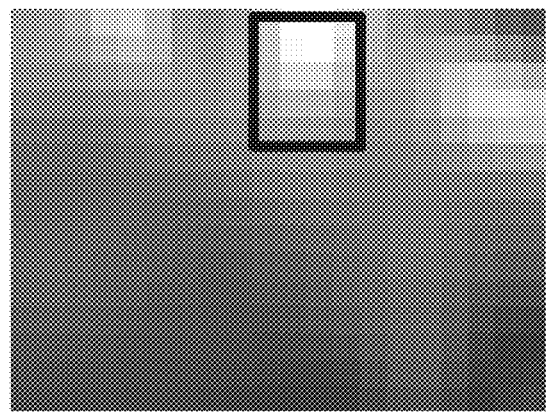
FIG. 7A is a diagram for explaining a salient region of the luminance saliency map shown in FIG. 5A.
Figure 7B:
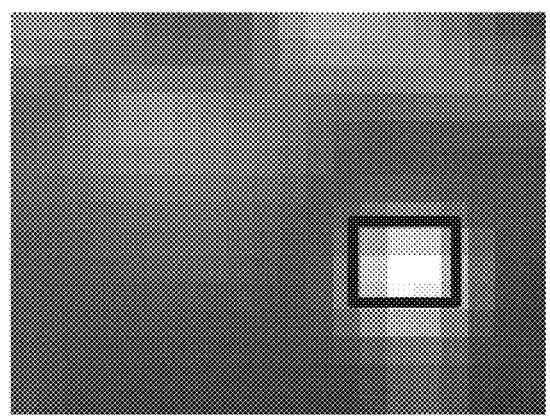
FIG. 7B is a diagram for explaining a salient region of the color saliency map shown in FIG. 5B.
Figure 7C:
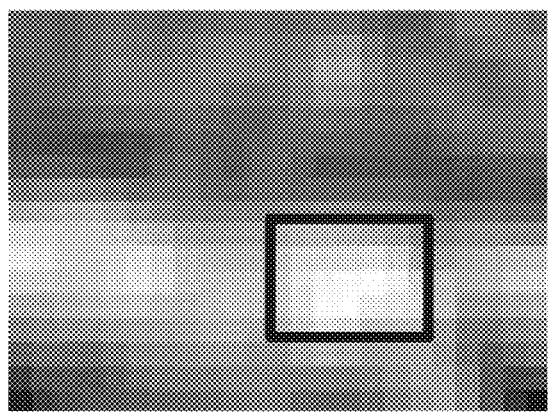
FIG. 7C is a diagram for explaining a salient region of the texture saliency map shown in FIG. 5C.

The salient-region-identifying portion 12 shown in FIG. 2 is configured to identify a high-saliency region as a salient region with respect to each of the luminance saliency map, the color saliency map, and the texture saliency map calculated by the saliency-map-calculating portion 11. The salient-region-identifying portion 12 is configured, for example, so as to identify, in each of the luminance saliency map, the color saliency map, and the texture saliency map, a region consisting of blocks having values that are greater than a threshold set in advance as a salient region. FIGS. 7A to 7C individually show, with thick solid lines, the salient regions identified from the individual saliency maps shown in FIGS. 5A to 5C.

As shown in FIG. 2, the salient-region-score-calculating portion 13 is: provided with an intra-salient-region average value/maximum value calculating portion 131, an extra-salient-region average value/standard deviation calculating portion 132, and a salient-region-score-generating portion 133; and configured to calculate scores for evaluating the degrees of saliency in the image with respect to the individual salient regions identified by the salient-region-identifying portion 12.

The intra-salient-region average value/maximum value calculating portion 131 is connected to the salient-region-identifying portion 12 and the salient-region-score-generating portion 133. The extra-salient-region average value/standard deviation calculating portion 132 is connected to the saliency-map-calculating portion 11, the salient-region-identifying portion 12, and the salient-region-score-generating portion 133. The salient-region-score-generating portion 133 is connected to the saliency-evaluating portion 14.

Figure 8:
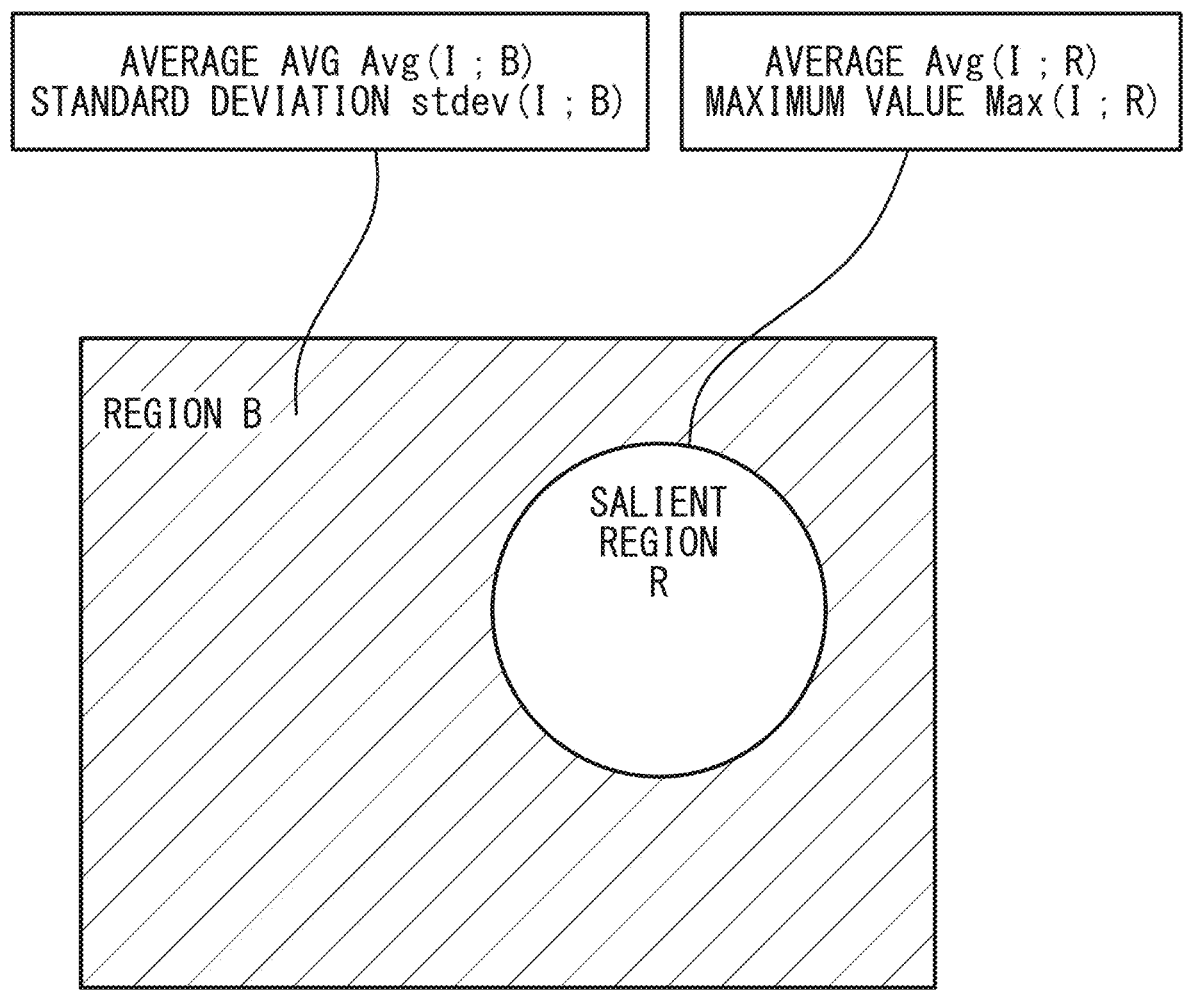
FIG. 8 is a schematic diagram for explaining a score calculation performed in a salient-region-score-calculating portion in the first embodiment of the present invention.

As shown in FIG. 8, the intra-salient-region average value/maximum value calculating portion 131 is configured to calculate, on the basis of a salient region R identified by the salient-region-identifying portion 12, an average Avg(I;R) of the saliency values in the salient region R and a maximum value Max(I;R) of the saliency values.

The extra-salient-region average value/standard deviation calculating portion 132 is configured to calculate, on the basis of the saliency maps calculated by the saliency-map-calculating portion 11 and the salient regions identified by the salient-region-identifying portion 12, an average Avg(I; B) of the saliency values and a standard deviation Stdev(I;B) of the saliency values for a region B, which is a region other than the salient region R.

The salient-region-score-generating portion 133 is configured to calculate, on the basis of the average Avg(I;R) and the maximum value Max(I;R) calculated by the intra-salient-region average value/maximum value calculating portion 131 and the average Avg(I;B) calculated by the extra-salient-region average value/standard deviation calculating portion 132, a difference between a weighted sum of the maximum value Max(I;R) and the average Avg(I;R) and the average Avg(I;B), and calculates this as a score S, as indicated in Expression (1).

$$S = (1-\alpha)Avg(I;R) + \alpha Max(I;R) - Avg(I;B) \quad (1),$$

where $\alpha$ is weight, and the range within which the values thereof can fall is $0 \leq \alpha \leq 1$.

In Expression (1), the difference between the weighted sum of the average Avg(I;R) and the maximum value Max(I;R) for the saliency maps in the salient region R and the average Avg(I;B) of the saliency maps in the region B, which is a region other than the salient region R, increases with an increase in the saliency as a region and decreases with a decrease in the saliency as a region. Because of this, by calculating the score on the basis of this difference, it is possible to more appropriately identify a high-saliency region contained in an image.

The above-described score S may be normalized by using the variability of a distribution of the saliency values in the region B. The variability of the distribution of the saliency-map values in the region B decreases with an increase in the saliency as a region and increases with a decrease in the saliency as a region. Because of this, by performing the normalization by using this variability, it is possible to more appropriately identify a high-saliency region contained in the image. For example, the standard deviation stdev(I;B) calculated by the extra-salient-region average value/standard deviation calculating portion 132 may be used as an indicator of the variability, and the score S may be calculated by using Expression (2) in which Expression (1) is divided by the standard deviation stdev(I;B).

$$S = \frac{(1-\alpha)Avg(I;R) + \alpha Max(I;R) - Avg(I;B)}{Stdev(I;B)} \quad (2)$$

As a result of Expression (2) being used for calculating the score S, for example, because the standard deviation Stdev(I;B) increases in the case in which the region B has several points at which the saliency values are high, the score S decreases. Conversely, because the standard deviation Stdev(I;B) decreases in the case in which the region B has low saliency values overall, the score S increases. Because of this, by calculating the score S by using the standard deviation Stdev(I;B), it is possible to more appropriately identify a high-saliency region contained in the image.

Figure 9A:
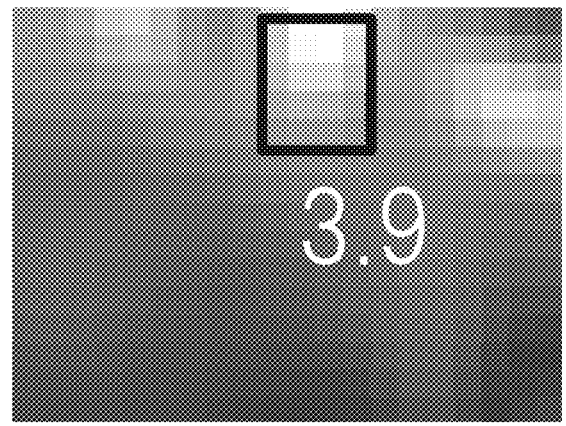
FIG. 9A is a diagram for explaining the score of the salient region of the luminance saliency map shown in FIG. 7A
Figure 9B:
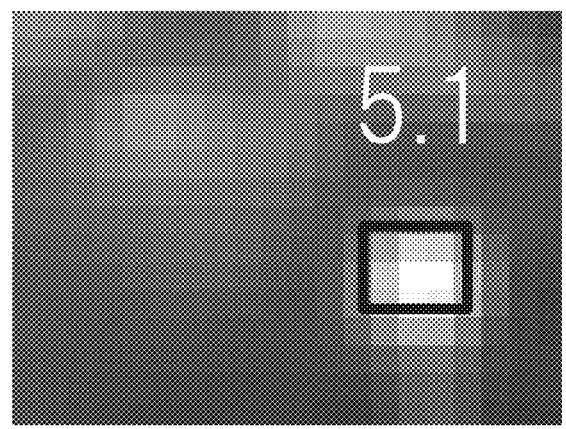
FIG. 9B is a diagram for explaining the score of the salient region of the color saliency map shown in FIG. 7B.
Figure 9C:
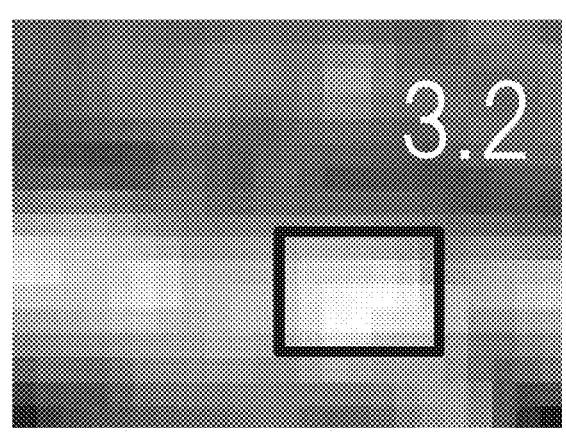
FIG. 9C is a diagram for explaining the score of the salient region of the texture saliency map shown in FIG. 7C.

FIGS. 9A to 9C indicate the scores calculated by means of Expression (2) for the individual salient regions in FIGS. 7A to 7C. With the color saliency map shown in FIG. 9B, the score is high as compared with the luminance saliency map shown in FIG. 9A and the texture saliency map shown in FIG. 9C, because the average value of the saliency values of the region other than the salient region is low and the standard deviation is low.

The saliency-evaluating portion 14 shown in FIG. 2 is configured to evaluate the saliency of the identified salient regions on the basis of the scores calculated by the salient-region-score-calculating portion 13. The saliency-evaluating portion 14 is configured, for example, to evaluate a salient region having the highest score to be a salient region having the highest saliency in the image.

In the following, an image-processing method of this embodiment, which is executed by the image-processing apparatus 1 having the above-described configuration, will be described with reference to FIGS. 1 and 10.

Figure 10:
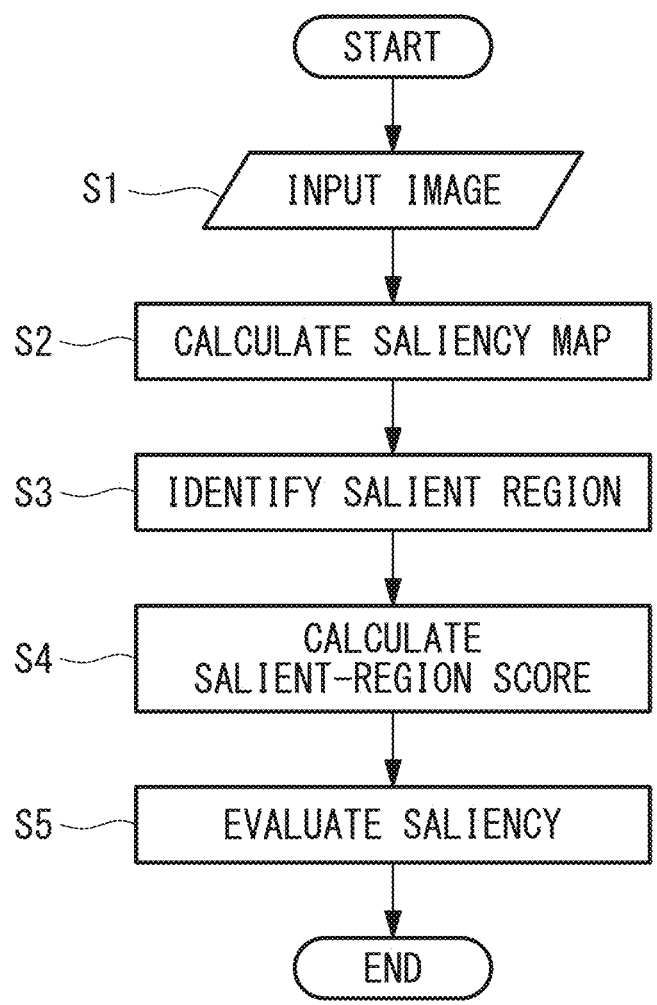
FIG. 10 is a flowchart of processing executed in the image-processing apparatus according to the first embodiment of the present invention.

First, as shown in FIG. 1, an image is input to the saliency-map-calculating portion 11 (step S1 in FIG. 10). Next, the saliency-map-calculating portion 11 calculates the saliency maps for different types of feature quantity (step S2 in FIG. 10). Next, the salient-region-identifying portion 12 identifies the salient regions R on the basis of the saliency maps calculated by the saliency-map-calculating portion 11 (step S3 in FIG. 10). Subsequently, the salient-region-score-calculating portion 13 calculates, on the basis of the salient regions R identified by the salient-region-identifying portion 12 and the saliency maps calculated by the saliency-map-calculating portion 11, the scores S of the salient region by comparing the distribution of the saliency-map values in the salient regions R and the distribution of the saliency-map values in the region B (step S4 in FIG. 10). Finally, the saliency-evaluating portion 14 evaluates the saliency on the basis of the scores S calculated by the salient-region-score-calculating portion.

As a result, for example, the salient region having the highest score S is evaluated to be a region having the highest saliency.

As has been described above, with this embodiment, because the score S is calculated by using not only the maximum value Max(I;R) and the average Avg(I;R) in the salient region R, but also the average Avg(I;B) and standard deviation Stdev(I;B) in the region B, which is the region other than the salient region R, it is possible to appropriately identify a high-saliency region contained in the image.

Note that, with this embodiment, although the weighed sum of the maximum value Max(I;R) and the average Avg(I;R) is employed as an indicator of the distribution of the values in the salient region R, and the average Avg(I;B) is employed as an indicator of the distribution of the values in the region B, there is no limitation thereto. For example, other statistics, such as the median and the mode, which serve as indicators of distributions of values in the individual regions may be employed.

Second Embodiment

An image-processing apparatus 101 according to a second embodiment will be described below with reference to the drawings.

As shown in FIG. 1, the image-processing apparatus 101 according to the second embodiment is provided with, as functional blocks: the saliency-map-calculating portion 11; the salient-region-identifying portion 12; a salient-region-score-calculating portion 23; and the saliency-evaluating portion 14.

The saliency-map-calculating portion 11 is connected to the salient-region-identifying portion 12 and the salient-region-score-calculating portion 23. The salient-region-identifying portion 12 is connected to the salient-region-score-calculating portion 23. The salient-region-score-calculating portion 23 is connected to the saliency-evaluating portion 14.

As has been described above, the configuration of the image-processing apparatus 101 according to this embodiment differs from that of the image-processing apparatus 1 according to the first embodiment in that a salient-region-score-calculating portion 23 is provided instead of the salient-region-score-calculating portion 13. In the following description, the portions having the same configurations as those in the image-processing apparatus 1 according to the first embodiment will be given the same reference signs, and the descriptions thereof will be omitted.

Figure 11:
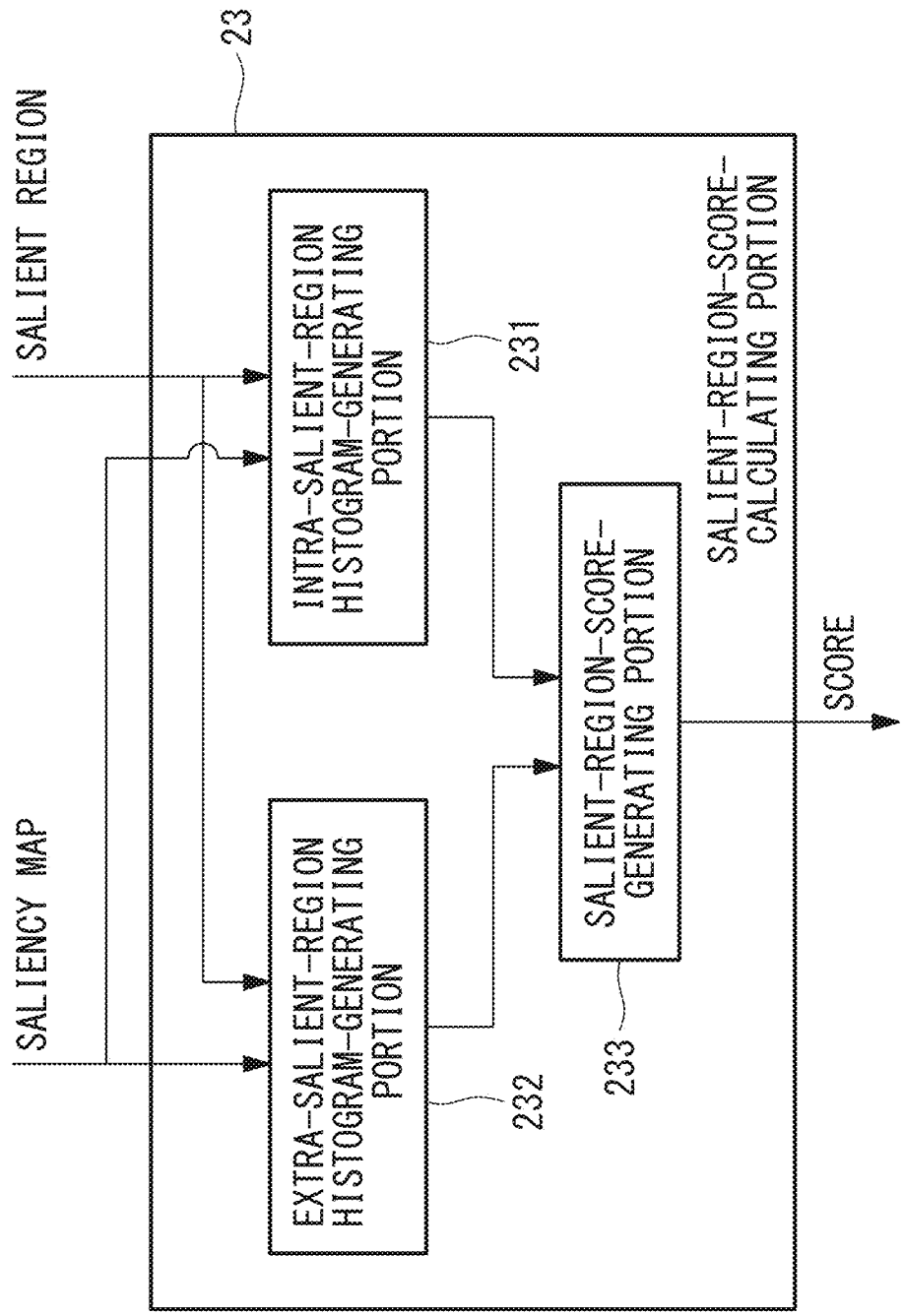
FIG. 11 is diagram showing the internal configuration of a salient-region-score-calculating portion provided in the second embodiment of the present invention.

As shown in FIG. 11, the salient-region-score-calculating portion 23 is: provided with an intra-salient-region histogram-generating portion 231, an extra-salient-region histogram-generating portion 232, and a salient-region-score-generating portion 233; and configured to calculate scores for evaluating the degrees of saliency in the image with respect to the individual salient regions identified by the salient-region-identifying portion 12.

The intra-salient-region histogram-generating portion 231 is connected to the saliency-map-calculating portion 11, the salient-region-identifying portion 12, and the salient-region-score-generating portion 233. The extra-salient-region histogram-generating portion 232 is connected to the saliency-map-calculating portion 11, the salient-region-identifying portion 12, and the salient-region-score-generating portion 233. The salient-region-score-generating portion 233 is connected to the saliency-evaluating portion 14.

Figure 12:
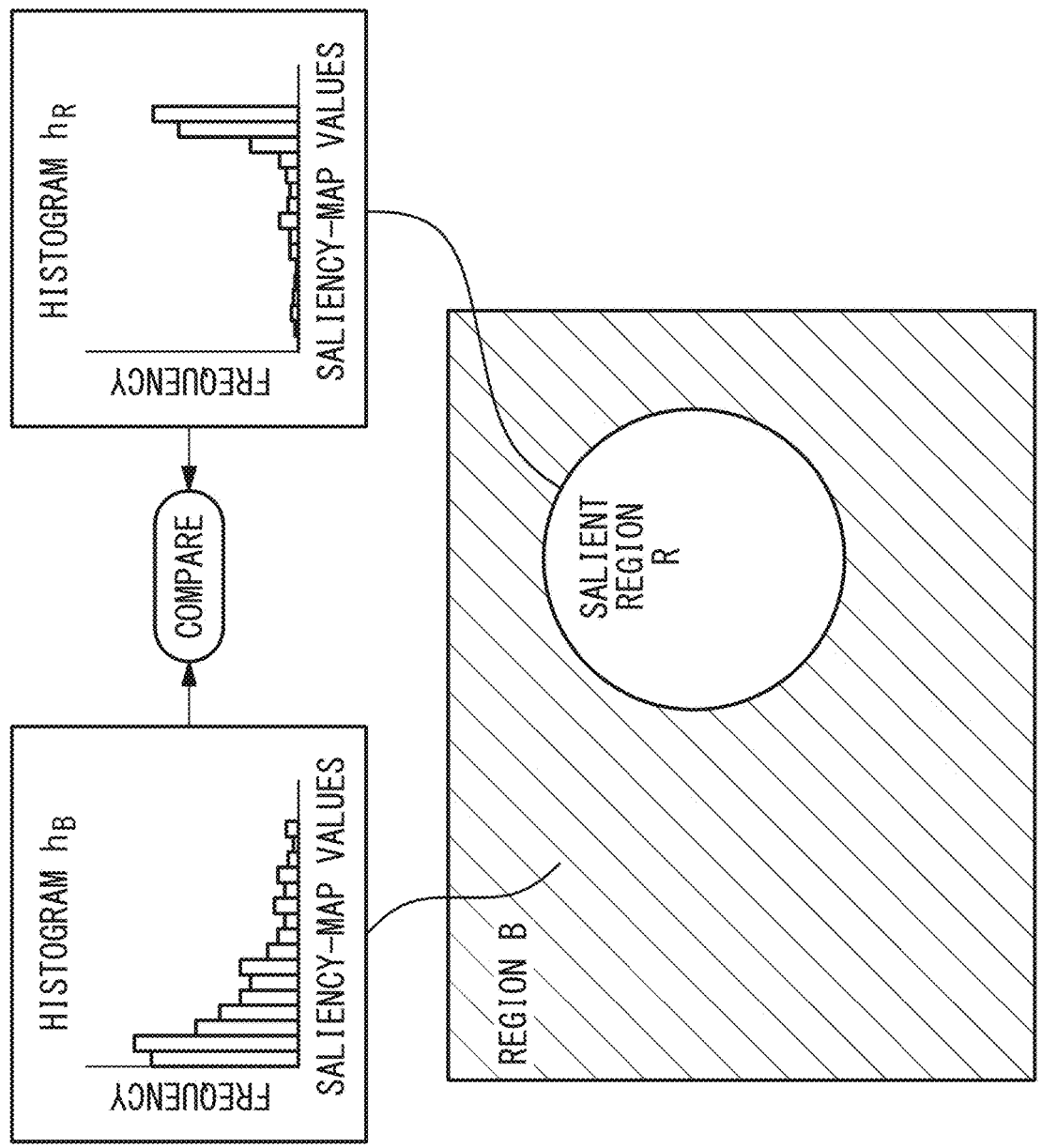
FIG. 12 is a schematic diagram for explaining a score calculation performed in the salient-region-score-calculating portion in the second embodiment of the present invention.

As shown in FIG. 12, the intra-salient-region histogram-generating portion 231 is configured to create a histogram $h_R$ in which the saliency-map values are plotted on the horizontal axis and the frequency is plotted on the vertical axis for the salient region R identified by the salient-region-identifying portion 12.

The extra-salient-region histogram-generating portion 232 is configured to create, on the basis of the saliency maps calculated by the saliency-map-calculating portion 11 and the salient regions identified by the salient-region-identifying portion 12, a histogram $h_B$ in which the saliency-map values are plotted on the horizontal axis and the frequency is plotted on the vertical axis for the region B, which is the region other than the salient region R.

The salient-region-score-generating portion 233 is configured to calculate, on the basis of the histogram $h_R$ created by the intra-salient-region histogram-generating portion 231 and the histogram $h_B$ created by the extra-salient-region histogram-generating portion 232, the Bhattacharyya distance, for example, as indicated in Expression (3), and calculates this as the score S.

$$S = d(h_R, h_B) = -\log(\Sigma_i^n \sqrt{h_{Ri} h_{Bi}}) \qquad (3)$$

Note that, in Expression (3), values $h_{Ri}$ and $h_{Bi}$ of the individual bins are calculated as the occurrence probability in which the number of times the bins occur are divided by the number of pixels in the respective regions.

As a result of Expression (3) being used to calculate the score S, the score S increases in the case in which the saliency-map distributions greatly differ between the region B, which is the region other than the salient region R, and the salient region R.

As has been described above, with this embodiment, because the salient region R is calculated by using not only the histogram $h_R$ for the salient region R but also the histogram $h_B$ for the region B, which is the region other than the salient region R, it is possible to appropriately identify a high-saliency region contained in the image.

Third Embodiment

An image-processing apparatus 201 according to a third embodiment will be described below with reference to the drawings.

As shown in FIG. 1, the image-processing apparatus 201 according to the third embodiment is provided with, as functional blocks: the saliency-map-calculating portion 11;

the salient-region-identifying portion 12; a salient-region-score-calculating portion 33; and the saliency-evaluating portion 14.

The saliency-map-calculating portion 11 is connected to the salient-region-identifying portion 12 and the salient-region-score-calculating portion 33. The salient-region-identifying portion 12 is connected to the salient-region-score-calculating portion 33. The salient-region-score-calculating portion 33 is connected to the saliency-evaluating portion 14.

As has been described above, the configuration of the image-processing apparatus 201 according to this embodiment differs from that of the image-processing apparatus 1 according to the first embodiment in that a salient-region-score-calculating portion 33 is provided instead of the salient-region-score-calculating portion 13. In the following description, the portions having the same configurations as those in the image-processing apparatus 1 according to the first embodiment will be given the same reference signs, and the descriptions thereof will be omitted.

Figure 13:
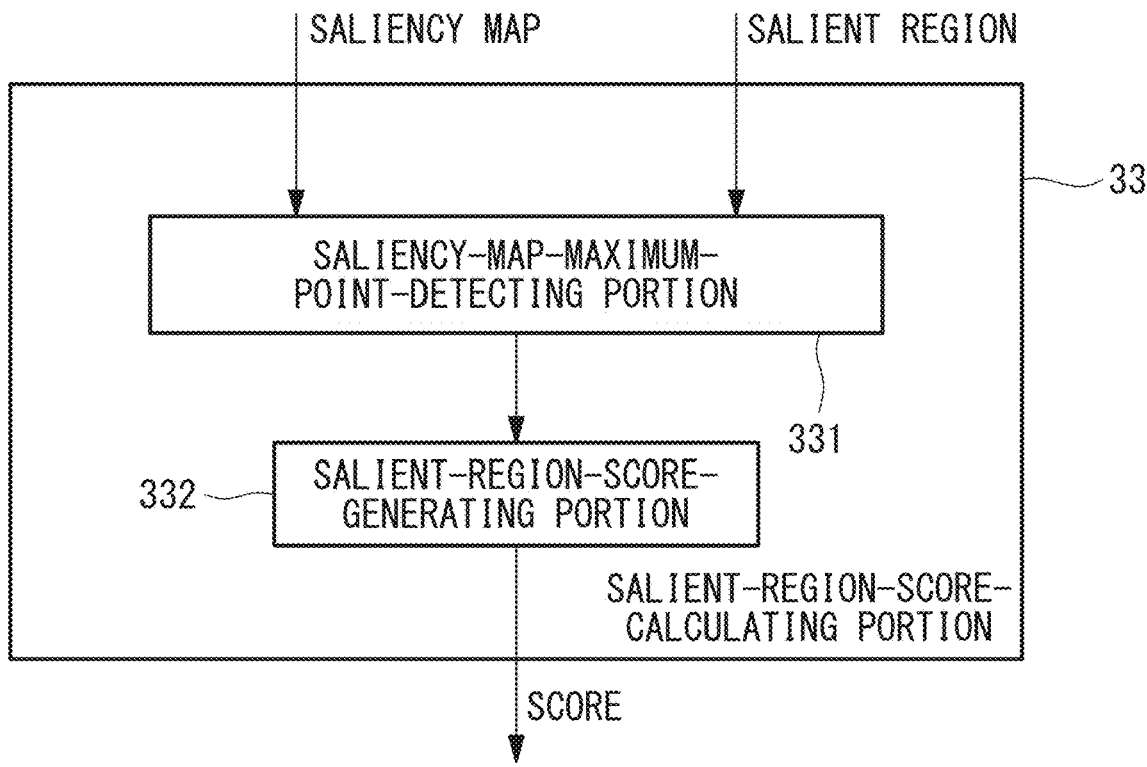
FIG. 13 is a diagram showing the internal configuration of a salient-region-score-calculating portion provided in an image-processing apparatus according to a third embodiment of the present invention.

As shown in FIG. 13, the salient-region-score-calculating portion 33 is: provided with a saliency-map-maximum-point-detecting portion 331 and a salient-region-score-generating portion 332; and configured to calculate scores for evaluating the degrees of saliency in the image with respect to the individual salient regions identified by the salient-region-identifying portion 12.

Figure 14:
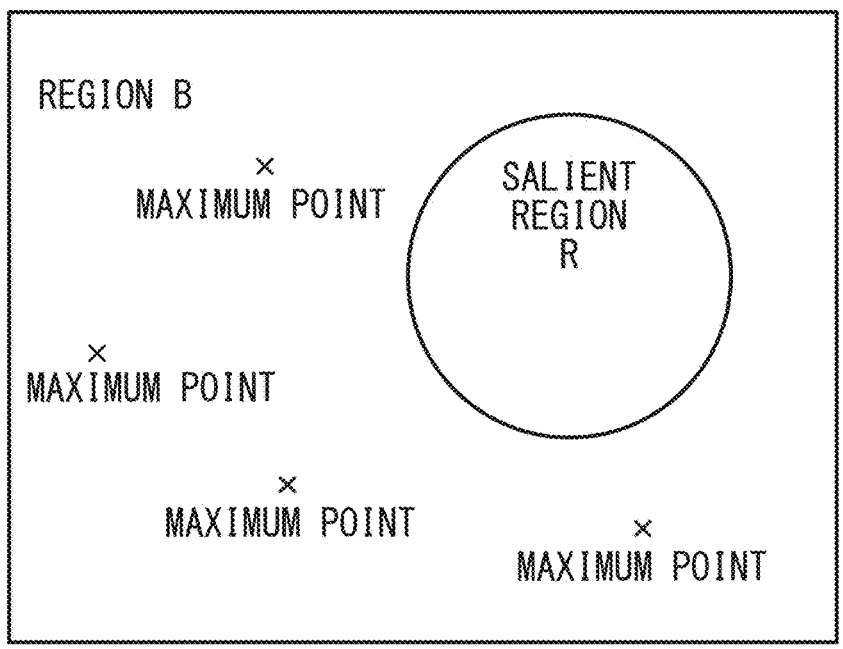
FIG. 14 is a diagram for explaining an example maximum point of a saliency map.

The saliency-map-maximum-point-detecting portion 331 is configured to detect, on the basis of the saliency maps calculated by the saliency-map-calculating portion 11 and the salient regions identified by the salient-region-identifying portion 12, maximum values of the saliency maps in the region B, which is the region other than the salient region R and to count the number thereof. For example, in the case of the example shown in FIG. 14, local maximum points existing in the region B are detected and the number thereof is counted to be four.

Figure 15:
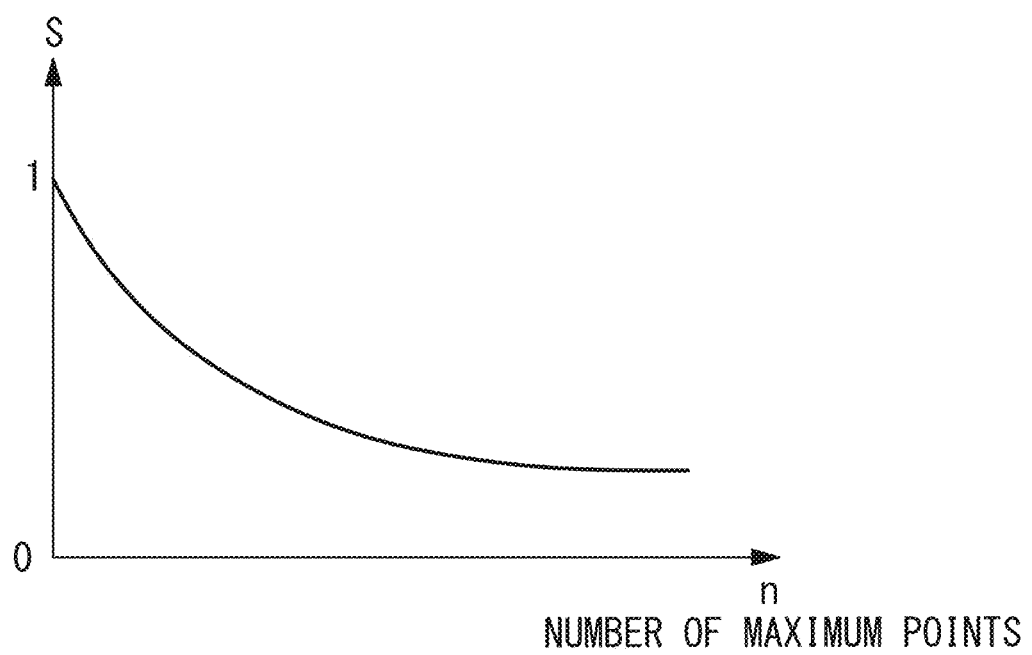
FIG. 15 is a diagram showing the relationship between the number of local maximum points of a saliency map and a correction factor.

The salient-region-score-generating portion 332 is configured to calculate the score S by means of the function indicated in Expression (4).

$$S = n^{-\alpha} \quad (4),$$

where, $\alpha$ is a parameter that takes an arbitrary positive number, and n indicates the number of local maximum points. As is clear from FIG. 15, which shows a graph of Expression (4), in the case in which a maximum point exists in the region B, which is the region other than the salient region R, the score decreases as compared with the case in which the number of local maximum points in the region B is zero.

As has been described above, with this embodiment, by utilizing the number of local maximum points in the region B, which is the region other than the salient region R, it is possible to appropriately identify a high-saliency region contained in the image.

Note that, in this embodiment, although the function indicated in Expression (4) is used, there is no limitation thereto, and a function in which S monotonically decreases with respect to n may be used.

As above, although the embodiments of the present invention have been described in detail with reference to the drawings, specific configurations are not limited to these embodiments, and design alterations within a range that does not depart from the scope of the present invention are also encompassed.

For example, the score obtained by the salient-region-score-calculating portion 33 provided in the image-processing apparatus 201 according to the third embodiment may be used as a correction factor, and the score obtained by the salient-region-score-calculating portion 13 provided in the image-processing apparatus 1 according to the first embodiment or the score obtained by the salient-region-score-calculating portion 23 provided in the image-processing apparatus 101 according to the second embodiment may be multiplied by the correction factor to calculate a final score.

In addition, in the above-described embodiment, although the saliency maps are calculated by the saliency-map-calculating portion 11 from the three types of feature quantity, that is, the luminance, the color, and the texture, these three types of feature quantity are not necessarily required, and the saliency maps may be calculated from at least one type of feature quantity.

In addition, the feature quantities obtained from the input image are not limited to the above-described three feature quantities, and it is possible to utilize various types of feature quantity that could be obtained from the input image.

As a result, the above-described embodiments lead to the following aspects.

A first aspect of the present invention is an image-processing apparatus including: a saliency-map calculating portion that is configured to calculate saliency maps on the basis of at least one type of feature quantity obtained from an input image; a salient-region-identifying portion that is configured to identify a salient region by using the saliency maps; a salient-region-score-calculating portion that is configured to calculate a score of the salient region by comparing a distribution of values of the saliency map in the salient region and a distribution of values of the saliency map in a region other than the salient region; and a saliency-evaluating portion that is configured to evaluate the saliency of the salient region on the basis of the score.

With the image-processing apparatus according to the above-described first aspect, the saliency-map calculating portion calculates the saliency maps based on at least one type of feature quantity, which is obtained from the input image, and the salient-region-identifying portion identifies the salient region by using the saliency maps. Then, the salient-region-score-calculating portion compares the distribution of the values of the saliency map in the salient region and the distribution of the values of the saliency map in the region other than the salient region, and calculates the score of the salient region. On the basis of the calculated score, the saliency-evaluating portion evaluates the saliency of the salient region.

In this way, because the score of the salient region is calculated by using not only the distribution of the values of the saliency map in the salient region but also the distribution of the values of the saliency map in the region other than the salient region, it is possible to appropriately identify a high-saliency region contained in the image.

In the image-processing apparatus according to the above-described first aspect, the salient-region-score-calculating portion may be configured to calculate the score on the basis of a difference between a weighted sum of an average value and a maximum value of the saliency map in the salient region and an average value of the saliency map in the region other than the salient region.

The difference between the weighted sum of the average value and the maximum value of the saliency map in the salient region and the average value of the saliency map in the region other than the salient region decreases with an increase in the saliency as a region. Because of this, by calculating the score on the basis of this difference, it is possible to more appropriately identify a high-saliency region contained in the image.

In the image-processing apparatus according to the above-described first aspect, the salient-region-score-calculating portion may be configured to normalize the score by using the variability of the distribution of the values of the saliency map in the region other than the salient region.

The variability of the distribution of the values of the saliency map in the region other the salient region decreases with an increase in the saliency as a region, and increases with a decrease in the saliency as a region. Because of this, by using this variability, it is possible to more appropriately identify a high-saliency region contained in the image.

In the image-processing apparatus according to the above-described first aspect, the salient-region-score-calculating portion may be configured to use, as the variability of the distribution of the values of the saliency map in the region other than the salient region, a standard deviation of the values of the saliency map.

The standard deviation of the distribution of the values of the saliency map in the region other than the salient region decreases with an increase in the saliency as a region and increases with a decrease in the saliency as a region. Because of this, by using this standard deviation, it is possible to more appropriately identify a high-saliency region contained in the image.

In the image-processing apparatus according to the above-described first aspect, the salient-region-score-calculating portion may be configured to calculate, at multiple scales, the saliency maps for the respective types of feature quantity.

By using the multiple scales, it is possible to change, for different scales, the size of the imaging subject to which the saliency map responds, and therefore, it is possible to detect imaging subjects of various sizes.

In the image-processing apparatus according to the above-described first aspect, the salient-region-score-calculating portion may be configured to calculate the score by calculating a difference between a histogram of the values of the saliency map in the salient region and a histogram of the values of the saliency map in the region other than the salient region.

The difference between the histogram of the values of the saliency map in the salient region and the histogram of the values of the saliency map in the region other than the salient region increases with an increase in the saliency as a region and decreases with a decrease in the saliency as a region. Because of this, by calculating the score on the basis of this difference, it is possible to more appropriately identify a high-saliency region contained in the image.

A second aspect of the present invention is an image-processing apparatus including: a saliency-map calculating portion that is configured to calculate saliency maps on the basis of at least one type of feature quantity obtained from an input image; a salient-region-identifying portion that is configured to identify a salient region by using the saliency maps; a salient-region-score-calculating portion that is configured to calculate a score by using the number of local maximum points in the saliency map in the region other than the salient region; and a saliency-evaluating portion that is configured to evaluate the saliency of the salient region on the basis of the score.

With the above-described image-processing apparatus according to the second aspect, the saliency-map calculating portion calculates the saliency maps based on at least one type of feature quantity, which is obtained from the input image, and the salient-region-identifying portion identifies the salient region by using the saliency maps. Then, the salient-region-score-calculating portion calculates the score of the salient region by using the number of local maximum points in the saliency map in the region other than the salient region. On the basis of the calculated score, the saliency-evaluating portion evaluates the saliency of the salient region.

In this way, because the score of the salient region is calculated by using the number of local maximum points in the saliency map in the region other than the salient region, it is possible to appropriately identify a high-saliency region contained in the image.

A third aspect of the present invention is an image-processing method including: a step of calculating saliency maps on the basis of at least one type of feature quantity obtained from an input image; a step of identifying a salient region by using the saliency maps; a step of calculating a score of the salient region by comparing a distribution of values of the saliency map in the salient region and a distribution of values of the saliency map in a region other than the salient region; and a step of evaluating the saliency of the salient region on the basis of the score.

A fourth aspect of the present invention is an image-processing program that causes a computer to execute: processing for calculating saliency maps on the basis of at least one type of feature quantity obtained from an input image; processing for identifying a salient region by using the saliency maps; processing for calculating a score of the salient region by comparing a distribution of values of the saliency map in the salient region and a distribution of values of the saliency map in a region other than the salient region; and processing for evaluating the saliency of the salient region on the basis of the score.

A fifth aspect of the present invention is an image-processing method including: a step of calculating saliency maps on the basis of at least one type of feature quantity obtained from an input image; a step of identifying a salient region by using the saliency maps; a step of calculating a score by using the number of local maximum points in the saliency map in a region other than the salient region; and a step of evaluating the saliency of the salient region on the basis of the score.

A sixth aspect of the present invention is an image-processing program that causes a computer to execute: processing for calculating saliency maps on the basis of at least one type of feature quantity obtained from an input image; processing for identifying a salient region by using the saliency maps; processing for calculating a score by using the number of local maximum points in the saliency map in a region other than the salient region; and processing for evaluating the saliency of the salient region on the basis of the score.

The present invention affords an advantage in that it is possible to appropriately identify a high-saliency region contained in the image.

REFERENCE SIGNS LIST

1, 101, 201 image-processing apparatus
11 saliency-map calculating portion
12 salient-region-identifying portion
13, 23, 33 salient-region-score-calculating portion
14 saliency-evaluating portion

The invention claimed is:

1. An image-processing apparatus comprising:
an image processor comprising circuitry or a hardware processor that operates under control of a stored program, the image processor being configured to execute processes comprising:
 a saliency-map calculating process that calculates saliency maps based on at least one type of feature quantity obtained from an input image;
 a salient-region-identifying process that identifies a salient region by using the saliency maps;
 a salient-region-score-calculating process that calculates a score of the salient region by comparing a distribution of values of the saliency map in the salient region and a distribution of values of the saliency map in a region other than the salient region; and
 a saliency-evaluating process that evaluates the saliency of the salient region based on the score,
wherein the salient-region-score-calculating process calculates the score based on a difference between a weighted sum of an average value and a maximum value of the saliency map in the salient region and an average value of the saliency map in the region other than the salient region.

2. An image-processing apparatus comprising:
an image processor comprising circuitry or a hardware processor that operates under control of a stored program, the image processor being configured to execute processes comprising:
 a saliency-map calculating process that calculates saliency maps based on at least one type of feature quantity obtained from an input image;
 a salient-region-identifying process that identifies a salient region by using the saliency maps;
 a salient-region-score-calculating process that calculates a score of the salient region by comparing a distribution of values of the saliency map in the salient region and a distribution of values of the saliency map in a region other than the salient region; and
 a saliency-evaluating process that evaluates the saliency of the salient region based on the score,
wherein the salient-region-score-calculating process normalizes the score by using variability of the distribution of the values of the saliency map in the region other than the salient region.

3. The image-processing apparatus according to claim 2, wherein the salient-region-score-calculating process uses, as the variability of the distribution of the values of the saliency map in the region other than the salient region, a standard deviation of the values of the saliency map.

4. An image-processing apparatus comprising:
an image processor comprising circuitry or a hardware processor that operates under control of a stored program, the image processor being configured to execute processes comprising:
 a saliency-map calculating process that calculates saliency maps based on of at least one type of feature quantity obtained from an input image;
 a salient-region-identifying process that identifies a salient region by using the saliency maps;
 a salient-region-score-calculating process that calculates a score by using a number of local maximum points in the saliency map in the region other than the salient region; and
 a saliency-evaluating process that evaluates the saliency of the salient region based on the score.

5. A non-transitory computer-readable storage medium storing an image-processing program that causes a computer to execute processes comprising:
 calculating saliency maps based on a basis of at least one type of feature quantity obtained from an input image;
 identifying a salient region by using the saliency maps;
 calculating a score of the salient region by comparing a distribution of values of the saliency map in the salient region and a distribution of values of the saliency map in a region other than the salient region, the score being calculated based on a difference between a weighted sum of an average value and a maximum value of the saliency map in the salient region and an average value of the saliency map in the region other than the salient region; and
 evaluating the saliency of the salient region based on the score.

6. A non-transitory computer-readable storage medium storing an image-processing program that causes a computer to execute processes comprising:
 calculating saliency maps based on at least one type of feature quantity obtained from an input image;
 identifying a salient region by using the saliency maps;
 calculating a score by using a number of local maximum points in the saliency map in a region other than the salient region; and
 evaluating the saliency of the salient region based on the score.

7. A non-transitory computer-readable storage medium storing an image-processing program that causes a computer to execute processes comprising:
 calculating saliency maps based on at least one type of feature quantity obtained from an input image;
 identifying a salient region by using the saliency maps;
 calculating a score of the salient region by comparing a distribution of values of the saliency map in the salient region and a distribution of values of the saliency map in a region other than the salient region, and normalizing the score by using variability of the distribution of values of the saliency map in the region other than the salient region; and
 evaluating the saliency of the salient region based on the score.

* * * * *